US011922059B2

(12) United States Patent
Chung et al.

(10) Patent No.: US 11,922,059 B2
(45) Date of Patent: Mar. 5, 2024

(54) METHOD AND DEVICE FOR DISTRIBUTED DATA STORAGE

(71) Applicant: Penta Security Systems Inc., Seoul (KR)

(72) Inventors: Myung Woo Chung, Seoul (KR); Chel Park, Seoul (KR); Sang Gyoo Sim, Seoul (KR); Eui Seok Kim, Seoul (KR); Duk Soo Kim, Seoul (KR); Seok Woo Lee, Seoul (KR)

(73) Assignee: Penta Security Systems Inc., Seoul (KR)

( * ) Notice: Subject to any disclaimer, the term of this patent is extended or adjusted under 35 U.S.C. 154(b) by 0 days.

(21) Appl. No.: 17/104,531

(22) Filed: Nov. 25, 2020

(65) Prior Publication Data

US 2022/0137876 A1   May 5, 2022

(30) Foreign Application Priority Data

Oct. 30, 2020   (KR) .................. 10-2020-0143083

(51) Int. Cl.
*G06F 12/00*   (2006.01)
*G06F 3/06*   (2006.01)
*H04L 9/40*   (2022.01)

(52) U.S. Cl.
CPC .......... *G06F 3/0659* (2013.01); *G06F 3/0611* (2013.01); *G06F 3/0653* (2013.01);
(Continued)

(58) Field of Classification Search
CPC ................ G06F 21/41; G06F 12/0866; G06F 2212/2022; G06F 2212/2146;
(Continued)

(56) References Cited

U.S. PATENT DOCUMENTS 9,674,079 B1 * 6/2017 Bellagamba ............ H04L 45/00
10,742,557 B1 * 8/2020 Miriyala ................. H04L 49/70
(Continued)

FOREIGN PATENT DOCUMENTS

KR   10-2018-0124419 A   11/2018
KR   10-2019-0083091 A   7/2019

OTHER PUBLICATIONS

Communication of office Action of Korean Patent Application No. 10-2020-0143083, dated Sep. 28, 2021, which corresponds to this application.
(Continued)

*Primary Examiner* — Mohamed M Gebril
(74) *Attorney, Agent, or Firm* — Goldilocks Zone IP Law

(57) ABSTRACT

A method of distributedly storing data in a system comprising a plurality of edge nodes communicatively coupled to an end device and a central cloud. The method includes: receiving, by a first edge node, data transmitted by the end device; assigning, by the first edge node, a data tag to received data according to attributes of the received data and duplicating the received data to generate a tagged data copy; and transmitting, by the first edge node, the tagged data copy to at least one second edge node determined by a data distribution policy determined by the central cloud directly or through the central cloud, so that the at least one second edge node store the tagged data copy in a storage.

6 Claims, 13 Drawing Sheets

(52) U.S. Cl.
CPC ............ *G06F 3/067* (2013.01); *H04L 63/105* (2013.01); *H04L 63/20* (2013.01)

(58) Field of Classification Search
CPC ........... G06F 2212/222; G06F 12/0804; G06F 2212/2515; G06F 30/15; G06F 30/20; G06F 3/0601
USPC ......................................................... 711/154
See application file for complete search history.

(56) References Cited

U.S. PATENT DOCUMENTS

| | | | | |
|---|---|---|---|---|
| 2006/0293767 | A1* | 12/2006 | Eischeid | G06F 3/0605 700/83 |
| 2011/0320606 | A1* | 12/2011 | Madduri | G06F 9/5005 726/1 |
| 2014/0095798 | A1* | 4/2014 | Doshi | G06F 11/1456 711/133 |
| 2015/0370643 | A1* | 12/2015 | Rueger | G06F 16/182 707/652 |
| 2017/0102757 | A1* | 4/2017 | Kang | H04L 41/0895 |
| 2018/0054395 | A1* | 2/2018 | Carey | G06F 11/2041 |
| 2019/0253319 | A1* | 8/2019 | Kampanakis | H04L 41/0894 |
| 2021/0011649 | A1* | 1/2021 | Doshi | G06F 3/0604 |
| 2021/0073047 | A1* | 3/2021 | Bhandaru | G06F 9/505 |
| 2021/0117283 | A1* | 4/2021 | Wang | G06F 11/1464 |
| 2022/0137876 | A1* | 5/2022 | Chung | G06F 3/067 711/154 |

OTHER PUBLICATIONS

Wei Yu, et al., A Survey on the Edge Computing for the Internet of Things, Special Section on Mobile Edge Computing, Nov. 29, 2017, pp. 6900-6919, vol. 6, IEEE Access.

Sahel Alouneh, et al., An Effective Classification Approach for Big Data Security Based on GMPLS/MPLS Networks, Security and Communication Networks, Jun. 13, 2018, pp. 1-11, vol. 2018, Hindawi.

Communication of European Patent Office Action of Application No. EP 20209529.5, dated May 26, 2021, which corresponds to this application.

\* cited by examiner

FIG. 9

| Security Level | Description |
|---|---|
| S1 | Very Low Security |
| S2 | Low Security |
| S3 | High Security |
| S4 | Very High Security |

FIG. 10

| Frequency | Description |
|---|---|
| F1 | Very Low Frequency |
| F2 | Low Frequency |
| F3 | High Frequency |
| F4 | Very High Frequency |

FIG. 11

| Availability Policy | Description |
|---|---|
| P1: Geographical location-based data distribution policy | · Determine distribution policy considering geographical locations of edge nodes<br>· Applicable to location-based service (LBS) such as Location Dynamic Map (LDM) |
| P2: Network-based data distribution policy | · Supporting efficient data distribution among edge nodes<br>· Determine distribution policy considering latency, structure, and the like of edge node network |

FIG. 13

| Node ID | Stored Data | | | | | Activation Status | Average of Request |
|---|---|---|---|---|---|---|---|
| | F1 | F2 | F3 | F4 | ... | | |
| Node 1 | 8 | 34 | 12 | 54 | ... | Active | 12Req/Sec |
| Node 2 | 23 | 77 | 76 | 44 | ... | Active | 32Req/Sec |
| Node 3 | 5 | 6 | 3 | 75 | ... | Active | 11Req/Sec |
| Node 4 | 6 | 4 | 91 | 6 | ... | Active | 78Req/Sec |
| Node 5 | 2 | 43 | 12 | 45 | ... | Inactive | 2Req/Sec |

METHOD AND DEVICE FOR DISTRIBUTED DATA STORAGE

CROSS-REFERENCE TO RELATED APPLICATION

The present application claims priority to Korean Patent Application No. 10-2020-0143083, filed on Oct. 30, 2020, in the Korean Intellectual Property Office, which is incorporated herein in its entirety by reference.

TECHNICAL FIELD

The present disclosure relates to a method and device for storing data in distributed locations and, more particularly, to a method and device for storing duplicated copies of data in distributed locations.

BACKGROUND

An edge cloud may refer to a segment of cloud computing system encompassing computing resources, including storages, located at an edge of the cloud and interconnected by a scalable, application-aware network to provide nearby terminals with an information service or an access of the computing resources. The edge cloud is getting pervasive with an increase in diverse and complex uses of data which are emerging as one of core aspects of the fourth industrial revolution.

When there occurs a data request between edge clouds, the request is handled by a central cloud, i.e., a central data center. Accordingly, a bottleneck may occur in the central cloud when lots of data requests occur simultaneously between the edge clouds. This may be a same problem as a conventional cloud computing environment. The bottleneck may cause an increase in a response time to the data request and may make real-time data processing difficult. Furthermore, the use of the edge clouds may make it difficult to manage data according to an importance of the data. Besides, the edge cloud computing system is vulnerable to an attack aimed at damaging of the data, e.g., a ransomware.

Backing up entire data stored in all the edge nodes to another edge nodes to solve the problem may place a great burden on the edge nodes having limited computing resources. Meanwhile, backing up the data to the central cloud having relatively abundant computing resources may be disadvantageous in that there may be no way to recover the backup data in the central cloud when the backup data in the central cloud is damaged.

SUMMARY

Provided is a method for solving a data availability problem that may occur in an edge cloud.

Provided is a method for removing a bottleneck that may occur in a central cloud.

According to an aspect of an exemplary embodiment of the present disclosure, provided is a method of distributedly storing data in a system comprising a plurality of edge nodes communicatively coupled to an end device and a central cloud. The method includes: receiving, by a first edge node, data transmitted by the end device; assigning, by the first edge node, a data tag to received data according to attributes of the received data and duplicating the received data to generate a tagged data copy; and transmitting, by the first edge node, the tagged data copy to at least one second edge node determined by a data distribution policy determined by the central cloud directly or through the central cloud, so that the at least one second edge node store the tagged data copy in a storage.

The operation of assigning data tag to received data according to attributes of the received data may include: assigning the data tag in consideration of at least one of: a required security level of the received data, an expected request frequency of the received data, and an availability policy for the received data.

The availability policy may include: either a policy based on geographic locations of the at least one second edge node storing the tagged data copy and the end device requesting stored tagged data copy or a policy based on a state of an edge node network.

The data distribution policy may include a policy by which the central cloud selects one or more edge nodes for storing the tagged data copy in consideration of storage spaces, activation status, and data processing speeds of the edge nodes in addition to the data tag.

The data distribution policy may include a policy by which the central cloud selects an edge node for storing the tagged data copy immediately accessible by the end device among the one or more edge nodes storing the tagged data copy.

The operation of transmitting the tagged data copy to at least one second edge node may include: receiving, by the first edge node, the data distribution policy determined by the central cloud when the one or more edge nodes are connected to a network; and transmitting, by the first edge node, the tagged data copy to the one or more second edge nodes according to the data distribution policy, so that the one or more second edge nodes store the tagged data copy.

According to another aspect of an exemplary embodiment of the present disclosure, provided is an edge node data processing device communicatively coupled to an end device, a central cloud, and multiple external edge node devices. The edge node data processing device includes: a processor; and a memory storing at least one instruction to be executed by the processor. The at least one instruction when executed by the processor causes the processor to: receive data transmitted by the end device; assign a data tag to received data according to attributes of the received data and duplicating the received data to generate a tagged data copy; and transmit the tagged data copy to the one or more external edge node devices determined among the multiple external edge node devices according to a data distribution policy determined by the central cloud directly or through the central cloud, so that the one or more external edge node devices store the tagged data copy in a storage.

The at least one instruction when executed by the processor may cause the processor to assign the data tag to the received data according to attributes of the received data causes the processor to: assign the data tag in consideration of at least one of: a required security level of the received data, an expected request frequency of the received data, and an availability policy for the received data.

The availability policy may include: either a policy based on geographic locations of the one or more external edge node devices storing the tagged data copy and the end device requesting stored tagged data copy or a policy based on a state of an edge node network.

The data distribution policy may include a policy by which the central cloud selects the one or more external edge node devices for storing the tagged data copy in consideration of storage spaces, activation status, and data processing speeds of the one or more external edge node devices in addition to the data tag.

The data distribution policy may include a policy by which the central cloud selects an edge node for storing the tagged data copy immediately accessible by the end device among the multiple edge node devices storing the tagged data copy.

The at least one instruction when executed by the processor causing the processor to transmit the tagged data copy to the one or more external edge node devices may cause the processor to: receive the data distribution policy determined by the central cloud when the one or more edge node devices are connected to a network; and transmit the tagged data copy to the one or more external edge node devices according to the data distribution policy, so that the one or more external edge node devices store the tagged data copy.

According to an embodiment of the present disclosure, data may be duplicated so that duplicated copies of the data may be stored in a plurality of edge clouds.

In particular, the duplicated copies of the data are distributedly stored in the plurality of edge clouds which are chosen by an efficient data distribution policy in consideration of states of the edge nodes.

The present disclosure enables to efficiently manage data according to required security levels of the data and prevent unauthorized duplication of the data which requires a high security level.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 9 is a table showing categories of data security levels among data attributes contained in the data tag;

FIG. 10 is a table showing categories of frequencies among the data attributes contained in the data tag;

FIG. 11 is a table showing categories of data availability policies among the data attributes contained in the data tag;

FIG. 13 is a table summarizing an example of states of edge nodes;

Figure 1:
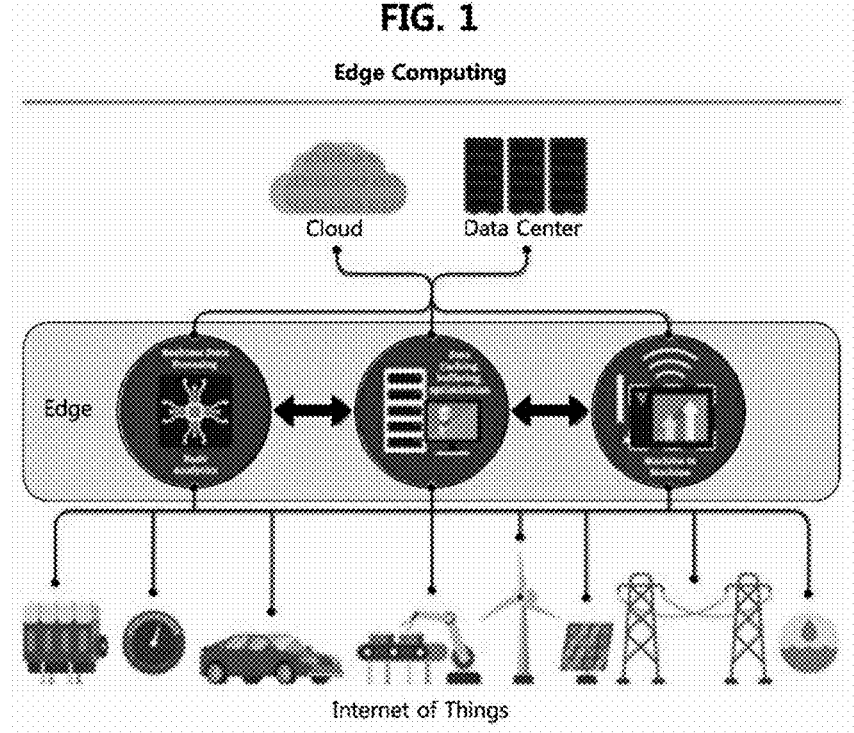
FIG. 1 is a schematic view of an edge cloud computing environment according to an embodiment of the present disclosure.

The drawings described herein are for illustration purposes only and are not intended to limit the scope of the present disclosure in any way.

DETAILED DESCRIPTION

Reference will now be made in detail to exemplary embodiments, examples of which are illustrated in the accompanying drawings, wherein like reference numerals refer to like elements throughout.

Various modifications may be made in the present disclosure and various embodiments may be implemented and thus certain embodiments are illustrated in the accompanying drawings and described in the detailed description. However, it should be understood that the present disclosure is not limited to particular embodiments and includes all modifications, equivalents, and alternatives falling within the idea and scope of the present disclosure. In describing each drawing, similar reference numerals have been used for similar components.

Terms such as first, second, A, and B may be used to describe various components but the components should not be limited by the terms. The terms are only used to distinguish one component from another. For example, a first component may be referred to as a second component without departing from the scope of the present disclosure, and similarly, a second component may also be referred to as a first component. The term "and/or" includes a combination of a plurality of related items described herein or any one of the plurality of related items.

When a component is referred to as being "coupled to" or "connected to" another component, it should be understood that the component may be directly coupled to or connected to the other component but another component may be interposed therebetween. In contrast, when a component is referred to as being "directly coupled to" or "directly connected" to another component, it should be understood that no component is interposed therebetween.

The terms used in this application are only used to describe certain embodiments and are not intended to limit the present disclosure. As used herein, the singular expressions are intended to include plural forms as well, unless the context clearly dictates otherwise. It should be understood that the terms "comprise" and/or "comprising", when used herein, specify the presence of stated features, integers, steps, operations, elements, components, or a combination thereof but do not preclude the presence or addition of one or more features, integers, steps, operations, elements, components, or a combination thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as having ideal or excessively formal meanings unless explicitly defined in the present application.

Hereinafter, embodiments of the present disclosure will be described in more detail with reference to the accompanying drawings. In describing the present disclosure, in order to facilitate an overall understanding thereof, the same components are assigned the same reference numerals in the drawings and are not redundantly described here. Hereinafter, embodiments of the present disclosure will be described in detail with reference to the accompanying drawings.

FIG. 1 is a schematic view of an edge cloud computing environment according to an embodiment of the present disclosure. An edge cloud computing system according to an embodiment of the present disclosure may include at least one central data center capable of providing many users over the Internet with computing resources and a plurality of edge servers distributed over multiple locations from the central data center. In the edge cloud computing system, the computing resources, especially data storages, required by client devices such as Internet-of-things (IoT) devices installed in logistics warehouses, connect cars, production facilities, wind power generators, solar cells, electric transmission facilities, and a meteorological observation equipment are decentralized to edge servers to improve response times and save bandwidth.

Figure 2:
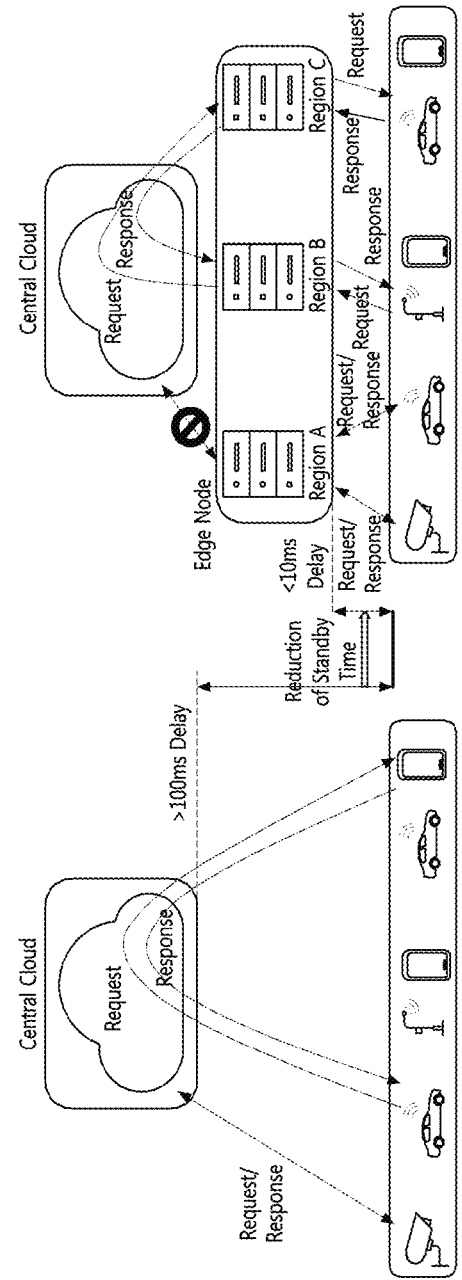
FIG. 2 is an illustration for explaining problems of a typical edge cloud computing system.

Referring to FIG. 2, when there occurs a data request between edge servers or edge clouds in a conventional edge cloud computing environment, the request is handled by the central data center or central cloud as mentioned above. Accordingly, a bottleneck may occur in the central cloud when lots of data requests occur simultaneously between the edge clouds. The bottleneck may cause an increase in a response time to the data request and make real-time data processing difficult. Furthermore, the use of edge nodes makes it difficult to manage data according to the importance of the data, and the edge cloud computing system is vulnerable to an attack aimed at damaging of the data, e.g., a ransomware.

Figure 3:
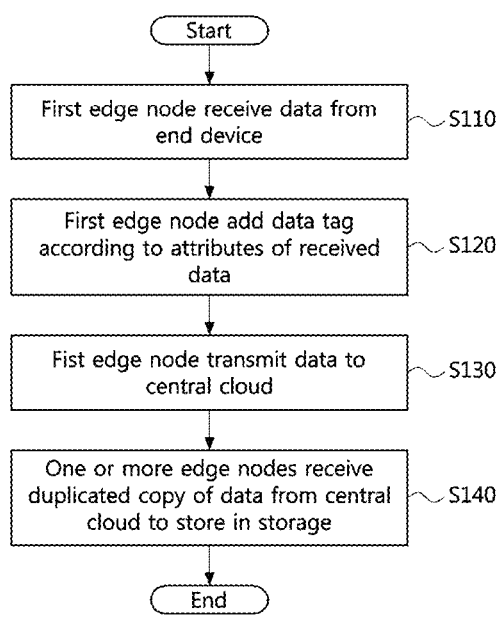
FIG. 3 is a flowchart illustrating a method of distributedly storing data according to an embodiment of the present disclosure.

FIG. 3 is a flowchart illustrating a method of distributedly storing data according to an embodiment of the present disclosure.

Referring to FIG. 3, the method of distributedly storing data according to an embodiment of the present disclosure may be performed in a distributed storage device including at least one edge node communicating with an end device and a central cloud.

First, a first edge node may receive data transmitted by the end device (S110). The data transmitted by the end device may include a hash calculated by a hash function.

Subsequently, the first edge node may add a data tag to the received data according to attributes of the received data (S120). The attributes of the received data may include at least one of: a required security level, an expected request frequency of the received data, and an availability policy for the received data.

The availability policy for the received data may indicate whether an availability policy should be determined as a policy that considers geographic locations of the edge nodes where the data is stored and the end device requesting data, or a policy that considers a state of an edge node network.

The data distribution policy may include a policy by which the central cloud selects one or more edge nodes for storing a data copy in consideration of storage spaces, activation status, and data processing speeds of the edge nodes in addition to the data tag.

Also, the data distribution policy may include a policy by which the central cloud selects an edge node for storing a data copy immediately accessible by the end device among the one or more edge nodes for storing the data copy.

The first edge node may transmit the data tagged with the data tag to the central cloud (S130).

Afterwards, a copy of data duplicated by the first edge node according to a distribution policy of the central cloud is transmitted to one or more edge nodes, so that the one or more edge nodes may store such data in a storage (S140). In more detail, the first edge node may receive the data distribution policy determined by the central cloud when the one or more edge nodes are connected to a network. Then, the first edge node may duplicate the data received from the end device. A copy of the data duplicated by the first edge node is transmitted to the one or more edge nodes. The one or more edge nodes may store a copy of the data duplicated by the first edge node in its storage.

Figure 4:
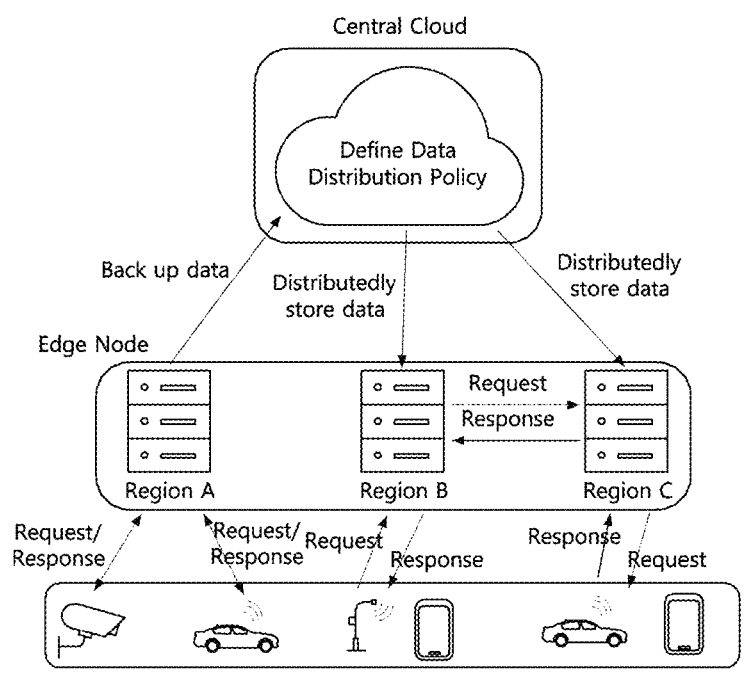
FIG. 4 is a diagram exemplarily showing data and signal flows during a process of distributedly storing data according to an embodiment of the present disclosure.

FIG. 4 shows an example of data and signal flows during a process of distributedly storing data according to an embodiment of the present disclosure. Each of the edge nodes in regions A, B, and C may provide services of storing and retrieving data to respective end devices in response to requests of the end devices. When the edge node covering the region A receives data that may be requested by the edge node covering the region B or region C, the edge node covering the region A may request the central cloud to back up the data. The central cloud may back up the data in the edge node covering the region B and/or region C according to the data distribution policy defined by the central cloud.

In the process of duplicating and storing data, the same data may be stored in a plurality of edge clouds. At this time, the availability policy for a plurality of edge clouds (e.g., whether the edge cloud is an available copy storage node storing a backup copy inaccessible by an end device or an enabled copy storage node immediately accessible by the end device) may be set, and the data may be duplicated to meet the availability policy for each of the edge clouds.

Also, an efficient data distribution policy may be determined according to characteristics of an application or service, or the attributes of the data, and status of the edge nodes. For example, in case of a location-based service (LBS), the availability policy may be determined in consideration of a physical distance between each of the edge nodes and the end device and/or the physical distances between the edge nodes. The availability policy may be determined in consideration of a network conditions of the edge nodes including conditions of requests for data storage or retrieval. In addition, the duplication of data may be restricted according to the security level of the data.

Figure 5:
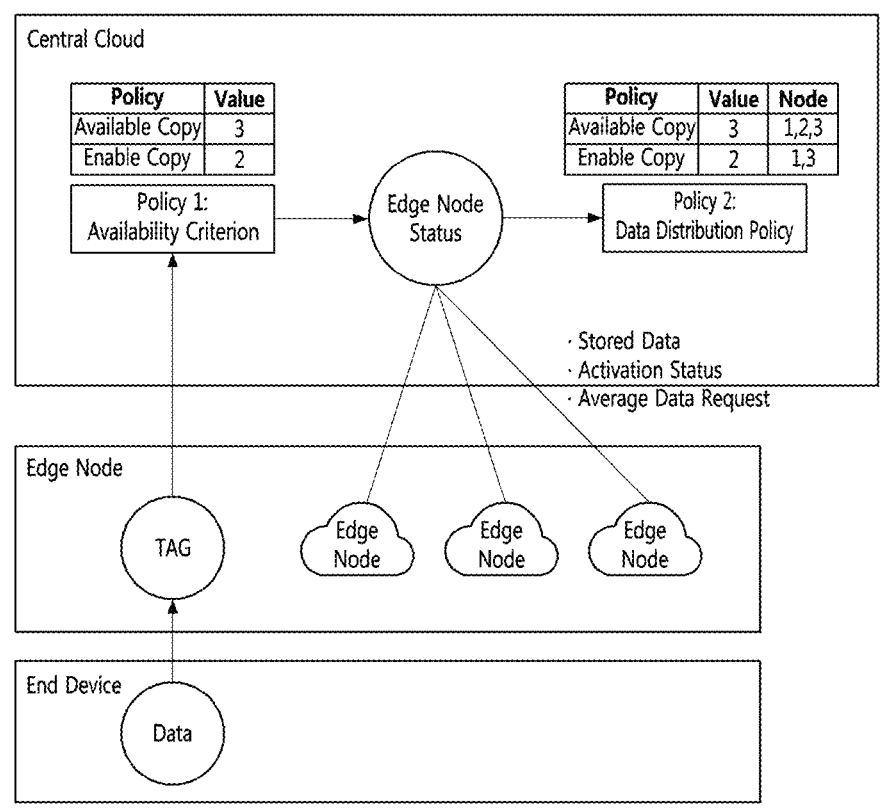
FIG. 5 is a diagram exemplarily showing a data tagging during the process of distributedly storing data.

FIG. 5 shows an example of a data tagging during the process of distributedly storing data according to an embodiment of the present disclosure.

The edge node receiving data from the end device may add or assign the data tag to the received data according to the attributes of the received data before sending the received data to the central cloud. The central cloud may determine the data distribution policy based on each field of the data tag to distribute the data to the edge nodes determined by the data distribution policy.

Figure 6:
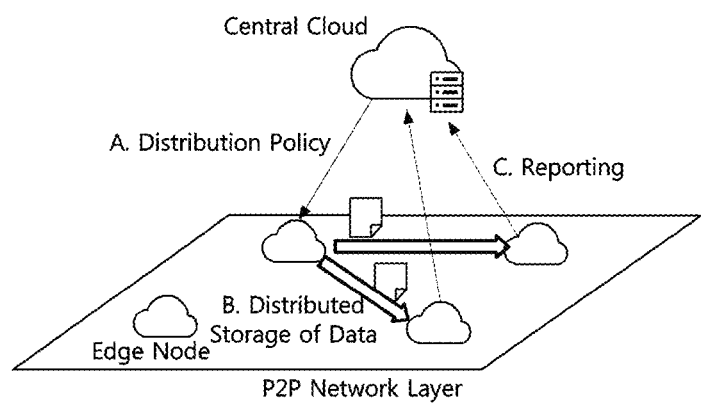
FIG. 6 is a diagram illustrating an example of a physical data path during the process of distributedly storing data.
Figure 7:
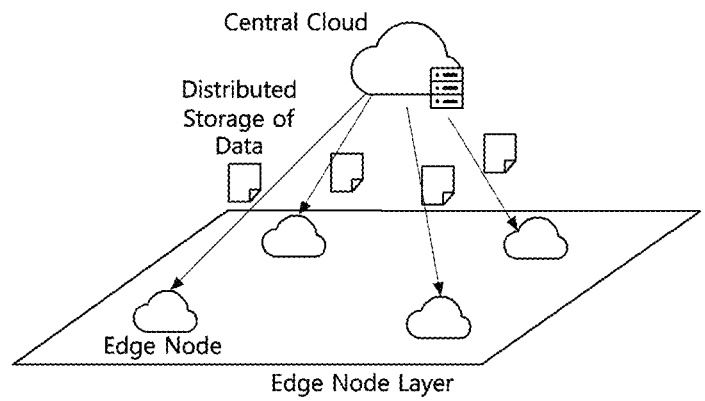
FIG. 7 is a diagram illustrating another example of the physical data path during the process of distributedly storing data.

FIG. 6 illustrates an example of a physical data path during the process of distributedly storing data, and FIG. 7 illustrates another example of the physical data path during the process of distributedly storing data according to an embodiment of the present disclosure. In the example of FIG. 6, the first edge node directly transfers the data to other edge nodes so that the edge nodes receiving the data stores the data. Contrarily, in the example of FIG. 7, the central cloud receives the data from the first edge node and transfers the data to the edge nodes in which the data is to be stored.

In case that a network connecting the edge nodes is formed, the first edge node may directly transfer the data to other nodes as shown in FIG. 6. In such a case, the first edge node may receive the data distribution policy from the central cloud and transmit data to other edge nodes so as to conform to the data distribution policy. Edge nodes having received the data can report a receipt of the data to the central cloud. Data transferring scheme shown in FIG. 6 can reduce data processing burden of the central cloud.

On the other hand, in case that there is no network connecting the edge nodes or it is difficult to transfer the data transmission between the edge nodes, the central cloud may lead the data transfer as shown in FIG. 7. At this time, the central cloud may distribute the data to the edge nodes according to the data distribution policy.

The data distribution policy may include a policy by which the central cloud selects one or more edge nodes for storing a data copy in consideration of storage spaces, activation status, and data processing speeds of the edge nodes in addition to the data tag.

Also, the data distribution policy may include a policy by which the central cloud selects an edge node for storing a data copy immediately accessible by the end device among the one or more edge nodes for storing the data copy.

Figure 8:
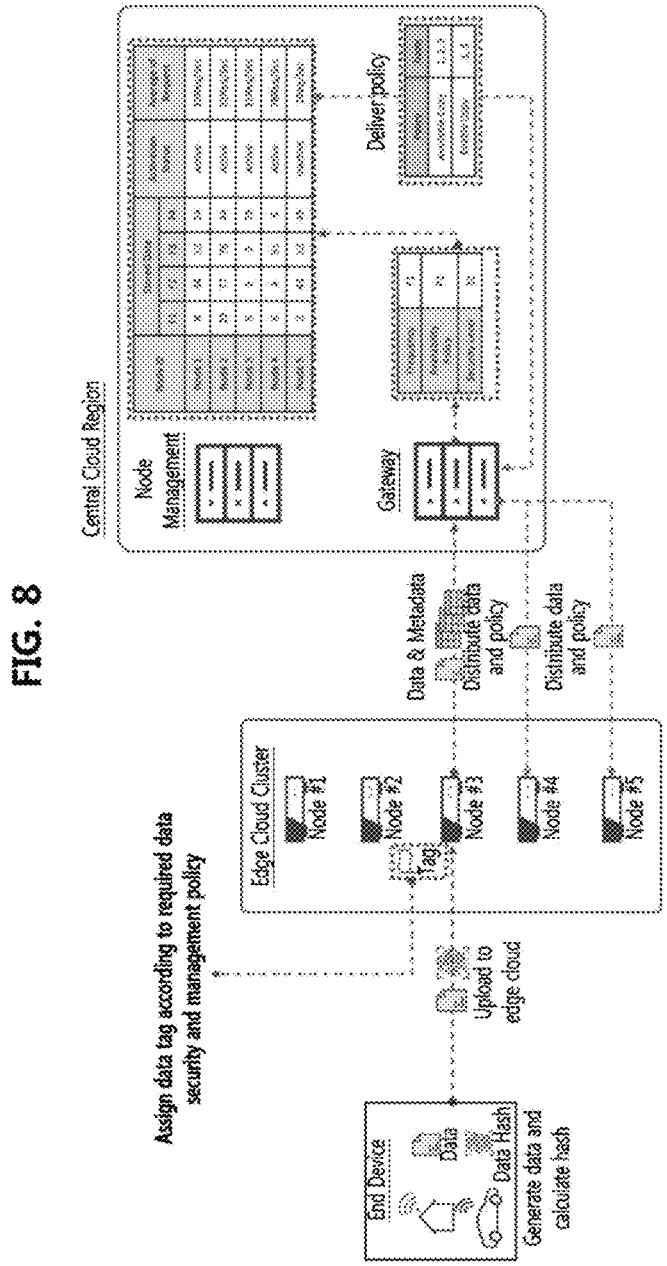
FIG. 8 illustrates a use of a data tag in more detail.

FIG. 8 illustrates a use of the data tag in more detail. FIGS. 9 to 11 are tables showing categories of data security levels, frequencies, and availability policies, respectively, among the data attributes contained in the data tag.

When the first edge node transmits the data to the central cloud or the other edge nodes, the first edge node may add the data tag to the data. The data tag may include one or more data attributes. The data attributes may include, for example, the security level of the data, the expected request frequency of the data, and the availability policy for the data. The data attributes included in the data tag may be transmitted to the central cloud in a form of metadata, for example. The central cloud manages each edge node based on the data attributes contained in the received metadata for each of the received data.

Referring to FIG. 9, the security level of the data can be classified into four levels. A security level S1 may be assigned to data which requires lowest security, and a security level S4 may be assigned to data which requires the highest security. Here, the data requiring high security refers to data of which duplication is restricted. Though the security level is classified into four levels for illustration, the present disclosure is not limited thereto.

Referring to FIG. 10, the expected request frequency of the data can be classified into four grades. A grade F1 may be assigned to data requested in a lowest frequency or data expected to be requested in a lowest frequency. A grade F4 may be assigned to data requested in a highest frequency or data expected to be requested in a highest frequency. The data request frequency may be determined based on statistics of previous data or predicted data. As the expected request frequency is higher, more edge nodes may store the enabled copies of the data which are immediately accessible to users. Though the expected request frequency is classified into four grades for illustration, the present disclosure is not limited thereto.

Referring to FIG. 11, the availability policy may include either a policy considers a geographic location-based availability policy or a network-based availability policy.

According to the geographic location-based availability policy, the data distribution policy is determined in consideration of the geographic locations of the edge nodes and the end devices as mentioned above. In the case of location-sensitive services, edge nodes may be selected such that the geographic locations of the edge node in which the data copy is to be stored and the end device requesting the data are close to each other. For example, the geographic location-based availability policy may be applied to a location-based service (LBS) such as a local dynamic map (LDM).

On the other hand, the network-based availability policy is a policy to support efficient data distribution among the edge nodes. Edge nodes may be selected in consideration of the latency and a structure of the edge node network.

Figure 12:
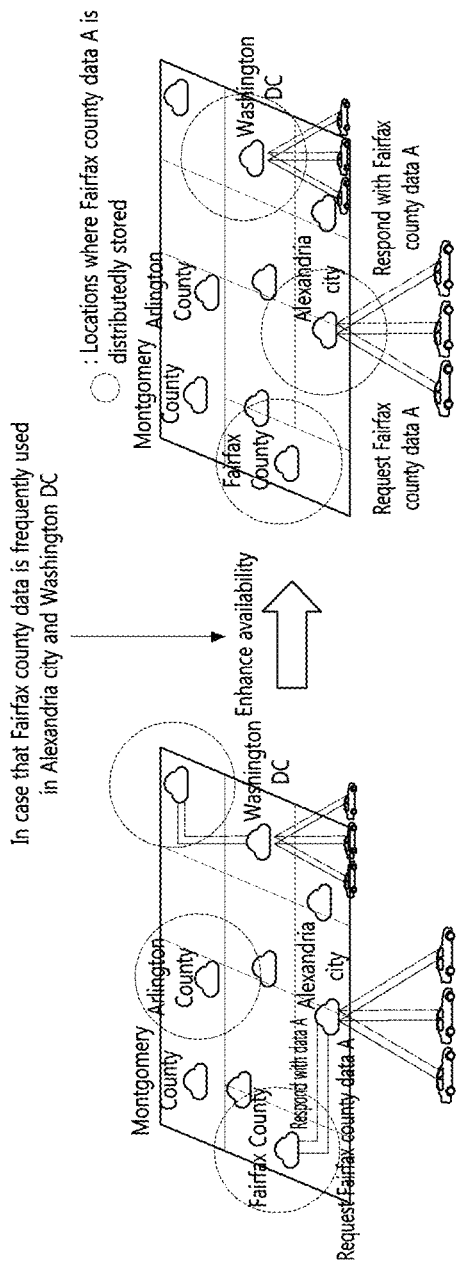
FIG. 12 shows an example of an application of the data availability policy.

FIG. 12 shows an example of an application of the data availability policy.

Generally, it is preferable that a service user requesting data receives the requested data from a nearest edge node or an edge node in the same geographic location as the service user while receiving the data from another edge node only when the nearest edge node does not have such data. Therefore, it is desirable that the data is distributedly stored in consideration of the service area, that is, such that the data storage location is the same as the service providing location, in order to enhance the availability of the data.

For example, it is assumed that certain data generated in Fairfax County is frequently used in Alexandria city and Washington D.C. If, however, the data from Fairfax County does not exist in the edge nodes located in Alexandria city and Washington D.C., the data should be received from another edge node, e.g., one located in Fairfax County. According to the distributed storage of data using the availability policy of the present disclosure, the data from Fairfax County are stored in the edge nodes in Alexandria city and Washington D.C. which are close to the end devices located in Alexandria city and Washington D.C. Thus, the edge node in Alexandria city or Washington D.C. close to the end device in Alexandria city or Washington D.C. can promptly respond to the data request of the end device.

FIG. 13 is a table summarizing an example of states of edge nodes.

The central cloud may implement the data distribution policy that determines to which node to transmit the data based on the states of the edge nodes. At this time, the states of the edge nodes may include a storage space, an activation status, and a data processing speed of each edge node.

Referring to FIG. 13, the states of the edge nodes may include stored data of each edge node, the availability of each edge node, and an average data request received by each edge node.

The availability of each edge node may indicate either an active state or an available state in which data can be received or an inactive state in which data cannot be received.

The stored data of each edge node, which may be acquired by the central cloud monitoring the amount of data stored in each of the edge nodes, may indicate the amount of data for each expected request frequency stored in each of the edge nodes or a ratio of the amount of the data for each expected request frequency stored in each of the edge nodes to a total amount of data stored in all or some of the edge nodes.

The average data request received by each edge node, which may be acquired by the central cloud monitoring a number of data requests processed by each of the edge nodes, may indicate a number of data requests processed per second by each of the edge nodes.

Figure 14:
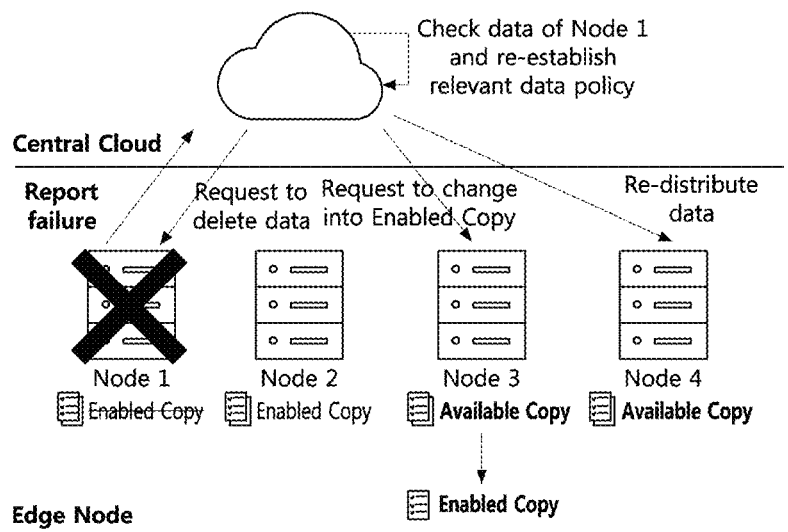
FIG. 14 illustrates an example of a method of distributedly storing data when there is a failure in an edge node.
Figure 15:
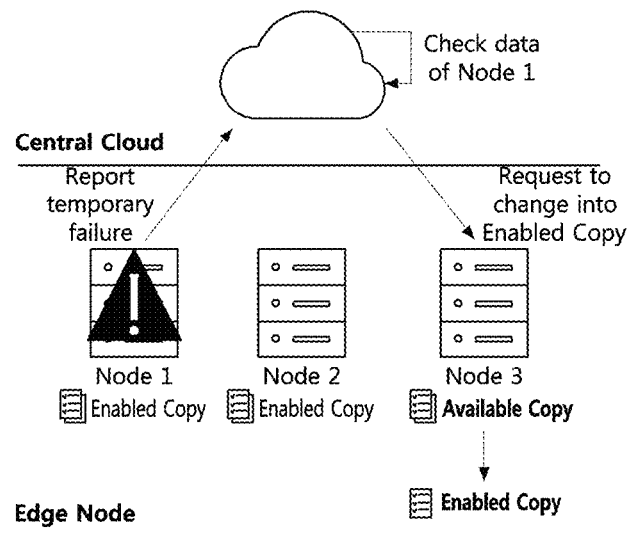
FIG. 15 illustrates another example of the method of distributedly storing data when there is a failure in an edge node.

FIGS. 14 and 15 illustrate examples of a method of distributedly storing data when there is a failure in the edge node.

While monitoring the edge nodes, the central cloud may find that the state of the first edge node changed from an active state to an inactive state due to a failure.

In case that the failure having occurred in the first edge node continues for a certain time as shown in FIG. 14, the central cloud may check previous data distribution policies to find a list of edge nodes storing the enabled copies of the duplicated data to request the edge nodes storing backup copies inaccessible by the end device to change into the edge nodes storing the enabled copies immediately accessible by the end device. Further, the central cloud may perform the data distribution policy again to request that a new edge node to store a copy of the data originated from the failed edge node, and may request the failed edge node to delete the data.

On the other hand, in case that the failure having occurred in the first edge node is temporary as shown in FIG. 14, the central cloud may choose an arbitrary edge node from among the edge nodes storing the copy of the duplicated data to request to change the state of the edge node from the edge node storing a backup copy inaccessible by the end device into the edge node storing the enabled copy immediately accessible by the end device.

Figure 16:
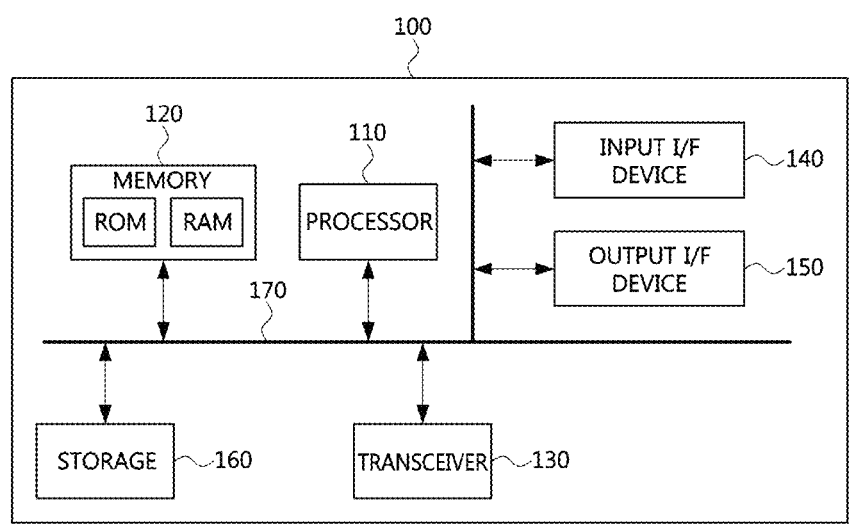
FIG. 16 is a block diagram of a device for distributedly storing data according to an embodiment of the present disclosure.

FIG. 16 is a block diagram of a device for distributedly storing data according to an embodiment of the present disclosure.

Referring to FIG. 16, the device 100 for distributedly storing data according to an embodiment of the present disclosure may include a processor 110, a memory 120 for storing at least one program instruction executable by the processor 110 and a result of execution of the at least one program instruction, and a data transceiver 130 connected to a network and performing communications with another device.

The device 100 for distributedly storing data may further include an input interface device 140, an output interface device 150, and a storage 160. The components of the device 100 for distributedly storing data may be connected through a bus 170 to communicate with each other.

The processor 110 may execute the at least one program instruction stored in the memory 120 and/or the storage 160. The processor 110 may be a central processing unit (CPU), a graphics processing unit (GPU), or a dedicated processor suitable for performing the methods of the present disclosure. Each of the memory 120 and the storage 160 may include a volatile storage medium and/or a non-volatile storage medium. For example, the memory 120 may include a read-only memory (ROM) and/or a random access memory (RAM).

The storage 160 may store the data distribution policy, for each data, determined by the central cloud, and may store the data from each of the edge nodes based on the data tag assigned according to the attributes of the data.

The at least one program instruction may include instructions, when executed by the processor, causing the processor to: receive data transmitted by the end device; assign a data tag to received data according to attributes of the received data and duplicating the received data to generate a tagged data copy; and transmit the tagged data copy to the one or more external edge node devices determined among the multiple external edge node devices according to a data distribution policy determined by the central cloud directly or through the central cloud, so that the one or more external edge node devices store the tagged data copy in a storage.

The at least one instruction when executed by the processor causing the processor to assign the data tag to the received data according to attributes of the received data may include instructions causing the processor to assign the data tag in consideration of at least one of: a required security level of the received data, an expected request frequency of the received data, and an availability policy for the received data.

The at least one instruction when executed by the processor causing the processor to transmit the tagged data copy to the one or more external edge node devices may include instructions causing the processor to: receive the data distribution policy determined by the central cloud when the one or more edge node devices are connected to a network; and transmit the tagged data copy to the one or more external edge node devices according to the data distribution policy, so that the one or more external edge node devices store the tagged data copy.

Operations according to embodiments of the present disclosure can be embodied as a computer-readable program or code in a computer-readable recording medium. The computer-readable recording medium includes all types of recording media storing data readable by a computer system. The computer-readable recording medium may be distributed over computer systems connected through a network so that a computer-readable program or code may be stored and executed in a distributed manner.

The computer-readable recording medium may include a hardware device specially configured to store and execute program commands, such as ROM, RAM, and flash memory. The program commands may include not only machine language codes such as those produced by a compiler, but also high-level language codes executable by a computer using an interpreter or the like.

Some aspects of the present disclosure have been described above in the context of a device but may be described using a method corresponding thereto. Here, blocks or the device corresponds to operations of the method or characteristics of the operations of the method. Similarly, aspects of the present disclosure described above in the context of a method may be described using blocks or items corresponding thereto or characteristics of a device corresponding thereto. Some or all of the operations of the method may be performed, for example, by (or using) a hardware device such as a microprocessor, a programmable computer or an electronic circuit. In some embodiments, at least one of most important operations of the method may be performed by such a device.

In embodiments, a programmable logic device (e.g., a field-programmable gate array) may be used to perform some or all of functions of the methods described herein. In embodiments, the field-programmable gate array may be operated with a microprocessor to perform one of the methods described herein. In general, the methods are preferably performed by a certain hardware device.

While the present disclosure has been described above with respect to embodiments thereof, it would be understood by those of ordinary skill in the art that various changes and modifications may be made without departing from the technical conception and scope of the present disclosure defined in the following claims.

What is claimed is:

1. A method of distributedly storing data in a system comprising a plurality of edge nodes communicatively coupled to an end device and a central cloud, the method comprising:
   receiving, by a first edge node, data transmitted by the end device;
   assigning, by the first edge node, a data tag to received data according to attributes of the received data and duplicating the received data to generate a tagged data copy, wherein the attributes of the received data include a required security level of the received data, an expected request frequency of the received data, and an availability policy for the received data, the expected request frequency being determined based on statistics of previous data or predicted data and being classified into a plurality of grades, and wherein as the expected request frequency is higher in the plurality of grades, more edge nodes stores enabled copies of the data which are immediately accessible by end devices;

transmitting, by the first edge node, a tagged data to the central cloud;

receiving, by the first edge node, a data distribution policy from the central cloud, wherein the data distribution policy is determined by the central cloud directly or through the central cloud, so that at least one second edge node of the plurality of edge nodes stores the tagged data copy in a storages of other edge nodes of the plurality of edge nodes; and transmitting, by the first edge node, the tagged data copy to at least one second edge node determined by the data distribution policy, wherein the data distribution policy includes a policy by which the central cloud selects one or more edge nodes for storing the tagged data copy based on states of the plurality of the edge nodes including storage spaces, activation status and data processing speeds of the plurality of the edge nodes in addition to the data tag, and a policy by which the central cloud selects an edge node immediately accessible by the end device among available copy storage nodes storing the tagged data copy as an enable copy storage node, the enable copy storage node being one of the available copy storage nodes, wherein the availability policy is set when the tagged data copy is stored in the at least one second edge node, and wherein the tagged data copy is duplicated to meet the availability policy which is for each of the other edge nodes and includes whether at least one of the other edge nodes is the available copy storage node or the enabled copy storage node.

2. The method of claim 1, wherein the availability policy further comprises:

either a policy based on geographic locations of the at least one second edge node storing the tagged data copy and the end device requesting the tagged data copy or a policy based on a state of an edge node network including the first edge node and the at least one second edge node.

3. An edge node data processing device communicatively coupled to an end device, a central cloud, and multiple external edge node devices, comprising:

a processor; and a memory storing at least one instruction to be executed by the processor, wherein the at least one instruction when executed by the processor causes the processor to:

receive data transmitted by the end device;

assign a data tag to received data according to attributes of the received data and duplicate the received data to generate a tagged data copy, wherein the attributes of the received data include a required security level of the received data, an expected request frequency of the received data, and an availability policy for the received data, the expected request frequency being determined based on statistics of previous data or predicted data and being classified into a plurality of grades, and wherein as the expected request frequency is higher in the plurality of grades, more edge nodes stores enabled copies of the data which are immediately accessible by end devices;

transmit a tagged data to the central cloud;

receive a data distribution policy from the central cloud, wherein the data distribution policy is determined by the central cloud directly or through the central cloud, so that at least one second edge node of the plurality of edge nodes stores the tagged data copy in storages of other edge nodes of the plurality of edge nodes; and transmit the tagged data copy to the at least one second edge node determined among the multiple external edge node devices according to the data distribution policy, wherein the data distribution policy includes a policy by which the central cloud selects one or more edge nodes for storing the tagged data copy based on states of the plurality of the edge nodes including storage spaces, activation status and data processing speeds of the plurality of the edge nodes in addition to the data tag, and a policy by which the central cloud selects an edge node for storing the data copy immediately accessible by the end device among available copy storage nodes storing the tagged data copy as an enable dopy storage node, the enable copy storage node being one of the available copy storage nodes, wherein the availability policy is set when the tagged data copy is stored in the at least one second edge node, and wherein the tagged data copy is duplicated to meet the availability policy which is for each of the other edge nodes and includes whether each of the other edge nodes is the available copy storage node or the enabled copy storage node.

4. The edge node data processing device of claim 2, wherein the availability policy further comprises:

either a policy based on geographic locations of the one or more external edge node devices storing the tagged data copy and the end device requesting the tagged data copy or a policy based on a state of an edge node network including the first edge node and the at least one second edge node.

5. A method of distributedly storing data in a system comprising a plurality of edge nodes communicatively coupled to an end device and a central cloud, the method comprising:

receiving, by a server of the central cloud, a tagged data transmitted from a first edge node of the plurality of edge nodes, wherein the first edge node assigns a data tag to data received from the end device according to attributes of the received data and duplicates the received data to generate a tagged data copy, wherein the attributes of the received data include a required security level of the received data, an expected request frequency of the received data, and an availability policy for the received data, the expected request frequency being determined based on statistics of previous data or predicted data and being classified into a plurality of grades, and wherein as the expected request frequency is higher in the plurality of grades, more edge nodes stores enable copies of the data which are immediately accessible by end devices;

selecting, by the server, at least one second edge node of the plurality of edge nodes for storing the tagged data copy duplicated by a data distribution policy in consideration of the data tag; and transmitting, by the server, the tagged data copy and t data c the at least one second edge node, wherein the data distribution policy comprises a policy by which the server selects the at least second edge node for storing the tagged data copy based on states of the plurality of the edge nodes including storage spaces, activation status, and data processing speeds of the edge nodes in addition to the data tag, and a policy by which the server selects an edge node for storing the data copy immediately accessible by the end device among available copy storage nodes storing the tagged data copy as an enable copy storage node, the enable copy storage node being one of the available copy storage nodes, wherein the availability policy is set when the tagged data copy is stored in the at least one second edge node, and wherein the tagged data copy is duplicated to meet the availability policy which is for each of the other edge nodes and includes whether at least one to the other edge nodes is the available copy storage node or the enabled copy storage node.

6. The method of claim 5, wherein the data distribution policy further comprises either a policy based on geographic locations of the at least one second edge node storing the tagged data copy and the end device requesting the tagged data copy or a policy based on a state of an edge node network including the first edge node and the at least one second edge node, wherein the policy based on a state of an edge node network includes transmitting the data distribution policy to the first edge node.

* * * * *